Sept. 3, 1935.  C. A. DE GIERS  2,013,138
REMOTE INDICATING PRESSURE GAUGE
Original Filed Oct. 1, 1930  2 Sheets-Sheet 1

INVENTOR
*Clarence A. de Giers*
BY
*Cooper, Kerr & Dunham*
ATTORNEY

Sept. 3, 1935.  C. A. DE GIERS  2,013,138
REMOTE INDICATING PRESSURE GAUGE
Original Filed Oct. 1, 1930  2 Sheets-Sheet 2

INVENTOR
Clarence A. deGiers
BY
Cooper, Kerr & Dunham
ATTORNEY

Patented Sept. 3, 1935

2,013,138

UNITED STATES PATENT OFFICE 2,013,138

REMOTE INDICATING PRESSURE GAUGE

Clarence A. de Giers, Forest Hills, N. Y., assignor, by mesne assignments, to Richard C. Murphy, New York, N. Y.

Original application October 1, 1930, Serial No. 485,808. Divided and this application April 27, 1932, Serial No. 607,684

7 Claims. (Cl. 73—110)

This invention pertains to remote control devices of the hydraulic type, particularly a modification adapted for use as a pressure gauge.

This application is a division of my application Serial No. 485,808, filed October 1, 1930, for remote control apparatus and which matured in a patent No. 1,881,266, Oct. 4, 1932.

Figure 1:
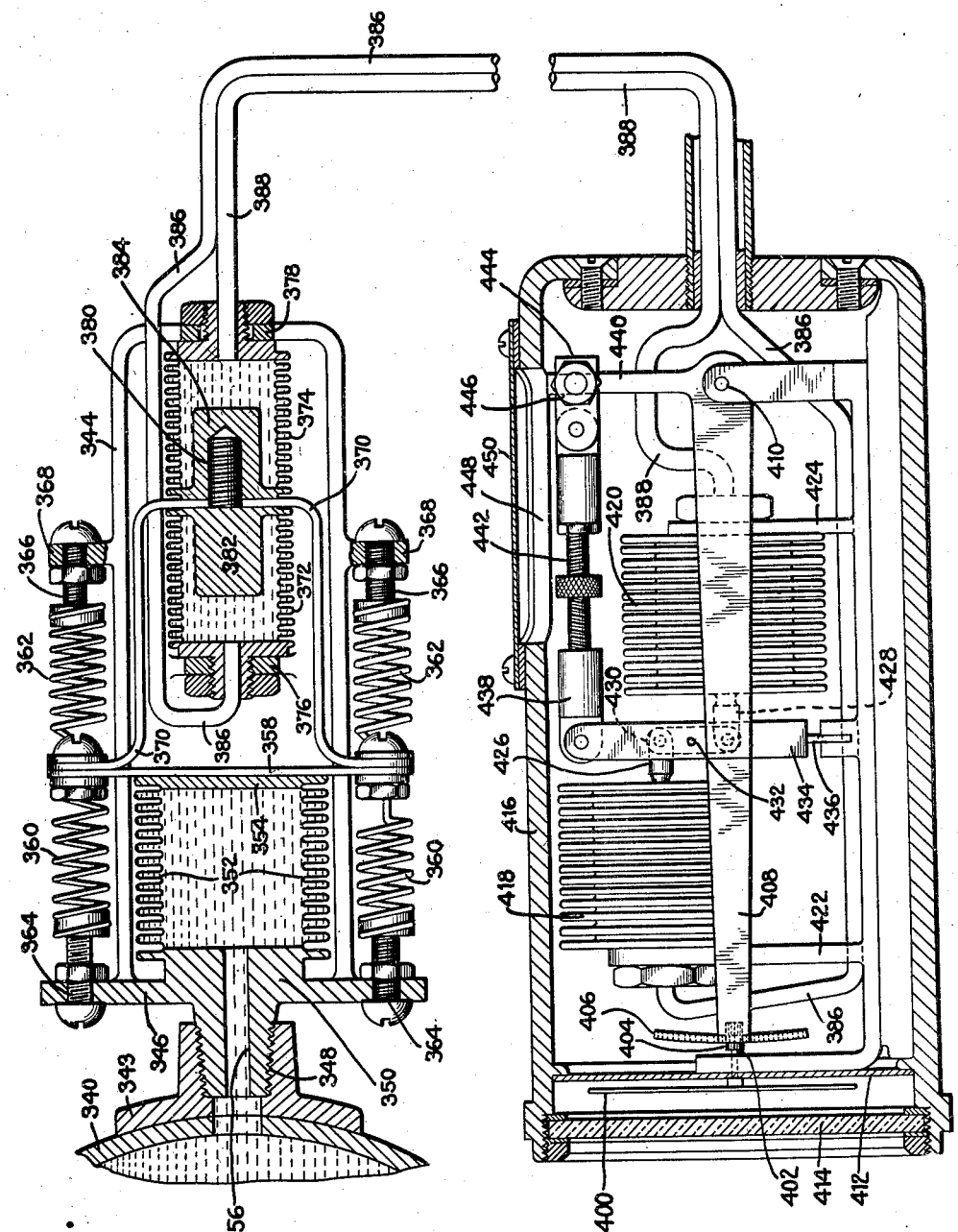
Fig. 1 is a view in cross-section of a remote indicating pressure gauge.

For the purpose of illustration a pressure tank 340 is shown having a flange 343 for convenience in attaching the actuating unit of the system. Considering first the modification shown in Fig. 1, a frame 344 having a base 346 is attached by nipple 348 to flange 343. Base 346 is provided with a boss 350 to which is attached a Sylphon 352 having a head 354. There is a passage through base 346, through which the Sylphon is filled with the same fluid as the tank. Any change of pressure in the tank will therefore be felt by the Sylphon, causing it to expand or contract axially.

Fast to head 354 and extending beyond it is a bar 358, to the outer ends of which are attached a pair of springs 360 tending to draw the bar toward base 346, and another pair of springs 362 tending to draw the bar in the opposite direction. The fixed ends of springs 360 are attached to base 346 by adjusting screws 364 while the fixed ends of springs 362 are attached by adjusting screws 366 to lugs 368 on frame 344. The above described arrangement of springs is provided to supplement the elasticity of Sylphon 352. The springs are adjusted by their adjusting screws so that even when there is no pressure in the tank the Sylphon will still be under substantial tension, thereby insuring a firm and definite zero reading which might not be the case were the Sylphon allowed to become entirely deflated under zero pressure. Springs 360 and 362 being similar and opposed, the position of the Sylphon head will be unaffected by changes of atmospheric temperature.

Attached to bar 358 is a U shaped yoke 370, to the cross bar of which are fast the free ends of a pair of axially aligned Sylphons 372 and 374, the fixed ends of which are fast to bosses 376 and 378 respectively, integral with frame 344. The adjacent heads of the Sylphons are secured to yoke 370 by a screw 380 on head 382 of Sylphon 372 passing through the yoke into head 384 of Sylphon 374.

It will be apparent from the above that yoke 370 will move back and forth with head 354 of Sylphon 352, and that when such movements occur one of the Sylphons 372, 374 will be expanded and the other contracted axially. Sylphons 372 and 374 are connected by tubes 386 and 388, respectively, to the indicating unit, which will now be described.

The indicating unit comprises a pointer 400, mounted for rotation on a spindle 402 carrying a pinion 404 in mesh with a rack 406 carried on the free end of arm 408 fulcrumed at 410. Pointer 400 rotates in front of a chart 412 and behind glass window 414 through which the indications of the pointer on the chart may be read. The indicating mechanism is all contained in a tubular housing 416 within which are mounted a pair of similar Sylphons 418, 420. These Sylphons are on parallel offset axes, their outer ends being fast to housing brackets 422, 424, respectively, and their adjacent ends being pivotally connected by studs 426, 428 to upper and lower ends of link 430. The center of the link is connected by pivot pin 432 to arm 434 attached to the housing by plate fulcrum 436. The free end of arm 434 is connected by link 438 to upwardly projecting arm 440, integral with arm 408.

Link 438 is adjustable in length by means of right and left screw 442 for the purpose of zero adjustment of pointer 400. The link is connected to arm 440 by block 444 settable on arm 440 by screw 446 for the purpose of adjusting the amplitude of rotation of arms 440, 408, and consequently of pointer 400. Hand hole 448 with cover 450 is provided to give access to the adjustments.

Tubes 386 and 388 are connected to the fixed ends of Sylphons 418, 420 respectively, and both pairs of Sylphons, with the tubes, are full of liquid.

In operation, when a change of pressure occurs, expansion or contraction of Sylphon 352 will cause yoke 370 to axially expand one of the Sylphons 372, 374 and contract the other, thereby, through movement of liquid through tubes 386, 388 causing one of the Sylphons 418, 420 to contract and the other to expand axially to move link 438 bodily to left or right and causing arms 434, 440 and 408 to swing about their fulcrums, thus causing pointer 400 to move to a new position relatively to chart 412.

If a change of atmospheric temperature occurs, thereby changing the volumes of Sylphons 372, 374, 418, 420, of the tubes connecting them, and of the liquid contained in the Sylphons and tubes, the effect is simply to axially expand or axially contract Sylphons 418, 420 similar amounts, thereby rotating link 430 about its fulcrum 432 without moving arm 434. Therefore the position of pointer 400 is not changed by change of temperature.

Figure 2:
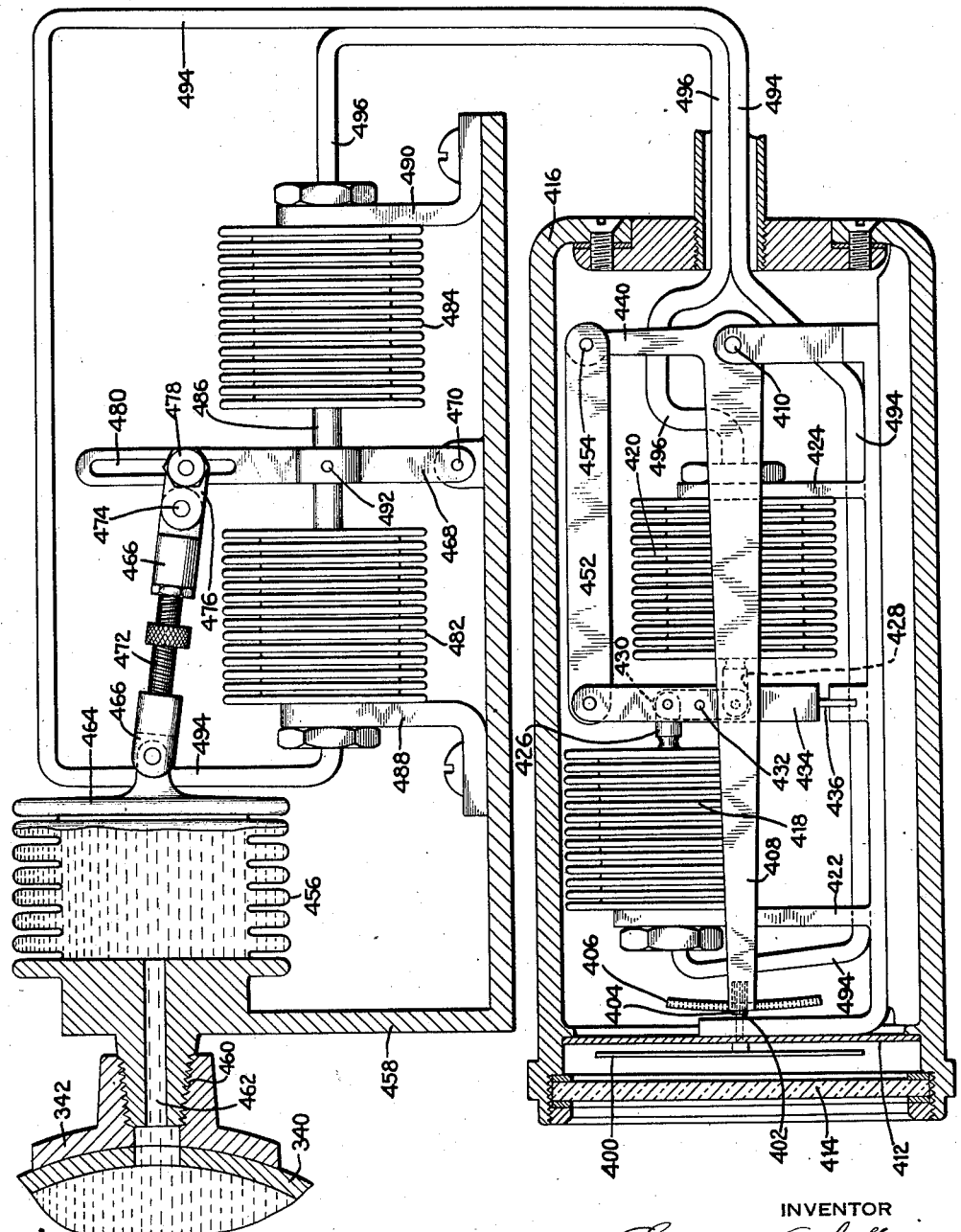
Fig. 2 is a view in cross-section of a remote indicating pressure gauge differing in detail from the apparatus shown in Fig. 1.

The modification shown in Fig. 2 is very similar to that described above. The indicating unit is exactly the same except that adjustable link 438 is replaced by a non-adjustable link 452 connected to arm 440 by a pivot pin 454 which is fixed in position on arm 440. Since there are no adjustments on link 452, there is no need for hand hole 448, which is therefore omitted. The actuating unit includes a power Sylphon 456 in place of the corresponding Sylphon 352 of Fig. 1. At its fixed end it is sealed to frame 458 which is attached to flange 342 by nipple 460 and connected to the interior of the tank by passage 462.

The movable head 464 of Sylphon 456 is connected by link 466 to the free end of arm 468 fulcrumed at 470. Link 466 is adjustable in length by the right and left screw 472 to provide a zero adjustment for pointer 400. The pivotal connection of the link to arm 468 is at 474, through the instrumentality of a clamp block 476, settable at any desired point on arm 468 by bolt 478 passing through slot 480, thus providing an adjustment for amplitude of rotation of the pointer.

A pair of axially aligned Sylphons 482, 484 (corresponding to 372, 374 of Fig. 1) are arranged with their adjacent ends joined by rod 486 and their outer ends fixed to brackets 488, 490 mounted on frame 458. Rod 486 is pivotally connected to arm 468 at 492. The fixed ends of Sylphons 482, 484 are connected to the fixed ends of Sylphons 418, 420 by tubes 494, 496 respectively.

In operation a change of pressure in the tank will cause Sylphon 456 to expand or contract axially, and, through link 466, arm 468 and rod 486 will cause one of the Sylphons 482, 484 to expand and the other to contract, thus, as in Fig. 1, actuating Sylphons 418, 420 and their attached transmission system to move pointer 400.

It is to be understood that the invention is not limited to the specific embodiment herein illustrated and described, but may be used in other ways without departure from its spirit as defined by the following claims.

I claim:

1. Pressure indicating apparatus comprising, in combination, a Sylphon adapted to expand or contract in response to change of pressure applied thereto, a pair of Sylphons operatively connected to said Sylphon whereby one of said pair will lengthen and the other shorten when said first Sylphon expands or contracts, a remote indicator, and means interconnecting said pair of Sylphons to said indicator whereby said indicator will move in harmony with the changes of length of said first Sylphon.

2. Pressure indicating apparatus comprising, in combination, a Sylphon adapted to expand or contract in response to change of pressure applied thereto, a pair of Sylphons operatively connected to said Sylphon whereby one of said pair will lengthen and the other shorten when said first Sylphon expands or contracts, a remote indicator, a second pair of Sylphons in communication with said first pair and mechanically connected to said indicator whereby said indicator is actuated in harmony with movements of said first Sylphon.

3. The invention set forth in claim 2 in which said mechanical connections include a floating link connected to each of said second pair of Sylphons to be actuated by each of said Sylphons in opposite directions whereby accuracy of the indications will be unaffected by change of temperature of the apparatus.

4. Pressure indicating apparatus comprising, in combination, a Sylphon adapted to expand or contract in response to change of pressure applied thereto, a pair of Sylphons operatively connected to said Sylphon whereby one of said pair will lengthen and the other shorten when said first Sylphon expands or contracts, a remote indicator, a second pair of Sylphons in communication with said first pair and mechanically connected through a floating link to said indicator whereby said indicator is actuated in harmony with movements of said first Sylphon, said link serving to maintain accuracy of the apparatus if changes of temperature occur.

5. Pressure indicating apparatus comprising, in combination, a Sylphon adapted to expand or contract in response to change of pressure applied thereto, a pair of Sylphons operatively connected to said Sylphon whereby one of said pair will lengthen and the other shorten when said first Sylphon expands or contracts, a remote indicator, and manually settable means between said Sylphon and said pair of Sylphons for adjusting the zero position of said indicator.

6. Pressure indicating apparatus comprising, in combination, a Sylphon adapted to expand or contract in response to change of pressure applied thereto, a pair of Sylphons operatively connected to said Sylphon whereby one of said pair will lengthen and the other shorten when said first Sylphon expands or contracts, a remote indicator, and manually settable means between said Sylphon and said pair of Sylphons for adjusting the amplitude of motion of said indicator.

7. Pressure indicating apparatus comprising, in combination, a Sylphon adapted to expand or contract in response to change of pressure applied thereto, a pair of Sylphons operatively connected to said Sylphon whereby one of said pair will lengthen and the other shorten when said first Sylphon expands or contracts, a remote indicator, and manually settable devices between said Sylphon and said pair of Sylphons for adjusting the zero position and amplitude of motion of said indicator, substantially as described.

CLARENCE A. DE GIERS.